US012648058B2

United States Patent

(12) United States Patent
Qi et al.

(10) Patent No.: US 12,648,058 B2
(45) Date of Patent: Jun. 2, 2026

(54) CONTROL METHOD FOR HEATING UNIT, HEATING UNIT, AND REFRIGERATING AND FREEZING APPARATUS

(71) Applicants: QINGDAO HAIER REFRIGERATOR CO., LTD., Qingdao (CN); HAIER SMART HOME CO., LTD., Qingdao (CN)

(72) Inventors: Feifei Qi, Qingdao (CN); Xiangpeng Song, Qingdao (CN); Zhanpeng Cui, Qingdao (CN); Zhiqiang Han, Qingdao (CN); Wenchao Xue, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 959 days.

(21) Appl. No.: 17/800,594

(22) PCT Filed: Feb. 9, 2021

(86) PCT No.: PCT/CN2021/076240
§ 371 (c)(1),
(2) Date: Aug. 18, 2022

(87) PCT Pub. No.: WO2021/164648
PCT Pub. Date: Aug. 26, 2021

(65) Prior Publication Data

US 2023/0345591 A1 Oct. 26, 2023

(30) Foreign Application Priority Data

Feb. 18, 2020 (CN) ......................... 202010099918.1
Feb. 18, 2020 (CN) ......................... 202020180615.8

(51) Int. Cl.
*H05B 6/68* (2006.01)
*H05B 6/64* (2006.01)

(52) U.S. Cl.
CPC ............... *H05B 6/68* (2013.01); *H05B 6/642* (2013.01)

(58) Field of Classification Search
CPC . H05B 6/62; H05B 6/64; H05B 6/642; H05B 6/6423; H05B 6/50; H05B 6/664;
(Continued)

(56) References Cited

U.S. PATENT DOCUMENTS 10,064,247 B2 8/2018 Nordh et al.
2002/0053565 A1 5/2002 Lee et al.
(Continued)

FOREIGN PATENT DOCUMENTS

CN 1168925 C 9/2004
CN 103428931 A 12/2013
(Continued)

OTHER PUBLICATIONS

KIPO, “Office Action for KR Application No. 10-2022-7027941”, Korea.

(Continued)

*Primary Examiner* — Hung D Nguyen
(74) *Attorney, Agent, or Firm* — troutman pepper locke; Tim Tingkang Xia, Esq.

(57) ABSTRACT

Provided are a control method for a heating unit, the heating unit, and a refrigerating and freezing apparatus. The control method includes: acquiring a forward power signal output from an electromagnetic wave generation module and a reverse power signal returned to the electromagnetic wave generation module; calculating an electromagnetic wave absorption rate of an item to be treated according to the forward power signal and the reverse power signal; and
(Continued)

adjusting a rotation speed of a cooling fan according to a power value of the forward power signal and the electromagnetic wave absorption rate. There is no need to dispose additional temperature sensing apparatuses, heat generated by the electromagnetic wave generation module can be reflected more precisely, and unexpected energy waste and noise pollution are avoided while fully cooling the electromagnetic wave generation module.

13 Claims, 6 Drawing Sheets

(58) Field of Classification Search
CPC .......... H05B 6/68; H05B 6/686; H05B 6/687; H05B 6/688; H05B 6/72; H05B 6/725; F25D 23/12; F25D 23/003; F25D 31/005
See application file for complete search history.

(56) References Cited

U.S. PATENT DOCUMENTS

| | | | | |
|---|---|---|---|---|
| 2012/0152937 | A1 | 6/2012 | Nordh et al. | |
| 2016/0212801 | A1 * | 7/2016 | Nishijima | H05B 6/642 |
| 2022/0086973 | A1 | 3/2022 | Wang et al. | |
| 2022/0113084 | A1 | 4/2022 | Wang et al. | |
| 2023/0254950 | A1 * | 8/2023 | Feng | H05B 6/642 219/757 |

FOREIGN PATENT DOCUMENTS

| | | | | |
|---|---|---|---|---|
| CN | 106016391 A | | 10/2016 | |
| CN | 209893723 U | | 1/2020 | |
| CN | 209893724 U | | 1/2020 | |
| CN | 209893783 U | | 1/2020 | |
| CN | 209897305 U | | 1/2020 | |
| CN | 211823376 U | | 10/2020 | |
| CN | 212211435 U | | 12/2020 | |
| DE | 202017105092 U1 | * | 9/2017 | A23L 5/15 |
| JP | S 57-196070 A | | 12/1982 | |
| JP | S 57-210277 A | | 12/1982 | |
| JP | 2006017418 A | | 1/2006 | |
| JP | 2018141625 A | | 9/2018 | |
| KR | 20190079474 A | | 7/2019 | |
| WO | WO-2011118198 A1 | * | 9/2011 | H05B 6/80 |

OTHER PUBLICATIONS

Notice of Allowance for China Patent Application No. 202010099918.1 dated Mar. 23, 2023 (1 page).
2nd Office Action for China Patent Application No. 202010099918.1 dated Nov. 1, 2022 (5 pages).
1st Examination Report for Australia Patent Application No. 2021223034 dated Jun. 14, 2023 (3 pages).
1st Office Action for Japan Patent Application No. 2022-547676 (3 pages).
International Search Report and Written Opinion for PCT/CN2021/076240 (ISA/CN) mailed Apr. 27, 2021 (5 pages).
Invitation pursuant to Rule 62a(1) EPC for EP Patent Application No. 21757869.9 dated May 12, 2023 (2 pages).
1st Office Action for EP Patent Application No. 21757869.9 dated Sep. 29, 2023 (6 pages).
Supplementary Partial European Search Report for EP Patent Application No. 21757869.9 dated Sep. 18, 2023 (5 pages).

* cited by examiner

CONTROL METHOD FOR HEATING UNIT, HEATING UNIT, AND REFRIGERATING AND FREEZING APPARATUS

CROSS-REFERENCE TO RELATED APPLICATIONS

The present application is a national phase entry of International Application No. PCT/CN2021/076240, filed Feb. 9, 2021, which claims priority to Chinese Patent Application Nos. 202010099918.1 and 202020180615.8, filed Feb. 18, 2020, respectively, which are each incorporated herein by reference in their entirety.

FIELD OF THE INVENTION

The present disclosure relates to the field of food processing, and in particular to a control method for a heating unit, the heating unit, and a refrigerating and freezing apparatus.

BACKGROUND OF THE INVENTION

During the freezing process of food, the quality of food is maintained. However, the frozen food needs to be heated before processing or eating. In order to facilitate a user freezing and heating food, in the prior art, food is generally thawed by providing an electromagnetic wave heating unit in a refrigerating and freezing apparatus such as a refrigerator.

However, an electromagnetic wave generation system of the heating unit may generate more heat in a working process, which not only causes temperature fluctuation of a storage compartment and influences the preservation quality of food materials in the storage compartment, but also can reduce the working efficiency of the electromagnetic wave generation system. The service life of an electric device may be shortened seriously if the heating unit is kept in a high-temperature state for a long time.

BRIEF DESCRIPTION OF THE INVENTION

An object of a first aspect of the present disclosure is to overcome at least one technical drawback in the prior art and to provide a control method for an electromagnetic wave heating unit.

A further object of the first aspect of the present disclosure is to reduce energy consumption.

An object of a second aspect of the present disclosure is to provide a heating unit.

An object of a third aspect of the present disclosure is to provide a refrigerating and freezing apparatus having the heating unit.

A further object of the third aspect of the present disclosure is to improve the cooling efficiency of an electromagnetic wave generation system.

According to the first aspect of the present disclosure, provided is a control method for a heating unit, the heating unit includes a cylinder configured to contain an item to be treated, and an electromagnetic wave generation system of which at least one part is disposed in the cylinder or accessed into the cylinder, the electromagnetic wave generation system including an electromagnetic wave generation module configured to generate an electromagnetic wave signal and a cooling fan configured to cool the electromagnetic wave generation module, wherein the control method includes:

acquiring a forward power signal output from the electromagnetic wave generation module and a reverse power signal returned to the electromagnetic wave generation module;

calculating an electromagnetic wave absorption rate of the item to be treated according to the forward power signal and the reverse power signal; and adjusting a rotation speed of the cooling fan according to a power value of the forward power signal, and the electromagnetic wave absorption rate.

Optionally, the step of adjusting a rotation speed of the cooling fan according to a power value of the forward power signal, and the electromagnetic wave absorption rate includes:

matching with the rotation speed of the cooling fan on the basis of a preset rotation speed correspondence relation according to the power value of the forward power signal, and the electromagnetic wave absorption rate, wherein the rotation speed correspondence relation records rotation speeds corresponding to power values in different ranges and electromagnetic wave absorption rates in different ranges; and under the condition that the power values of the forward power signal are the same, the rotation speed of the cooling fan is in negative correlation with an average value of the electromagnetic wave absorption rates in different ranges; and under the condition that the electromagnetic wave absorption rates are the same, the rotation speed of the cooling fan is in positive correlation with an average value of the power values in different ranges.

Optionally, the electromagnetic wave generation module includes a frequency source, a power amplifier and a processing unit; and the control method further includes:

acquiring a temperature of the processing unit; and controlling the frequency source and the power amplifier to stop working if the temperature of the processing unit is greater than or equal to a preset temperature threshold.

Optionally, after the step of controlling the frequency source and the power amplifier to stop working, the control method further includes:

controlling the cooling fan to work at a rated rotation speed for a first preset time, and controlling the cooling fan to stop working after the first preset time.

According to the second aspect of the present disclosure, provided is a heating unit, including:

a cylinder, configured to contain an item to be treated;

an electromagnetic wave generation system, at least one part thereof being disposed in the cylinder or accessed into the cylinder to generate an electromagnetic wave in the cylinder to heat the item to be treated, and the electromagnetic wave generation system including an electromagnetic wave generation module configured to generate an electromagnetic wave signal and a cooling fan configured to cool the electromagnetic wave generation module; and a controller, configured to execute any one of the control methods mentioned above.

Optionally, the electromagnetic wave generation system further includes:

a radiating antenna, disposed in the cylinder, and electrically connected to the electromagnetic wave generation module to radiate the electromagnetic wave in the cylinder; and

- a bidirectional coupler, connected between the electromagnetic wave generation module and the radiating antenna in series, and configured to monitor the forward power signal and the reverse power signal.

Optionally, the cylinder defines a heating chamber configured to contain the item to be treated; and

- the electromagnetic wave generation module is disposed on an outer side of the heating chamber.

According to the third aspect of the present disclosure, provided is a refrigerating and freezing apparatus, including:

- a cabinet, defining at least one storage compartment; and
- any of the heating units mentioned above, wherein
- the cylinder is disposed in one of the at least one storage compartment, and the electromagnetic wave generation module is disposed on an outer side of a heat insulating layer of the cabinet.

Optionally, the refrigerating and freezing apparatus further includes:

- a housing, disposed to cover the electromagnetic wave generation module and the cooling fan; and
- a separator, disposed in the housing and located on a side of the cooling fan away from the electromagnetic wave generation module to separate a space in the housing into an air inlet area and an air outlet area, wherein
- the cooling fan and the electromagnetic wave generation module are disposed in the air outlet area;
- the air inlet area and the air outlet area are respectively provided with at least one air inlet and at least one air outlet in a circumferential direction of the cooling fan, and at least one air vent is formed in a position of the separator corresponding to the cooling fan; and
- a flowing direction of air flow from the at least one air inlet to the at least one air vent respectively is perpendicular to a flowing direction of air flow from the at least one air vent to each air outlet.

Optionally, the electromagnetic wave generation system further includes:

- a power supply module, configured to provide electric energy for the electromagnetic wave generation module, wherein
- the power supply module is disposed in the air outlet area, and located on a side of the electromagnetic wave generation module perpendicular to the flowing direction of air flow from the at least one air vent to each air outlet; and
- the power supply module is provided with a heat conducting material, and the heat conducting material is disposed to be thermally connected to the separator.

In the present disclosure, the rotation speed of the cooling fan for cooling the electromagnetic wave generation module is adjusted according to the power value of the forward power signal output from the electromagnetic wave generation module and the electromagnetic wave absorption rate of the item to be treated. Compared to the means of adjusting the rotation speed of the cooling fan according to the temperature of the electromagnetic wave generation module, there is no need to dispose additional temperature sensing apparatuses, heat generated by the electromagnetic wave generation module can be reflected more precisely, and unexpected energy waste and noise pollution are avoided while fully cooling the electromagnetic wave generation module, and thus user experiences are improved.

Further, in the present disclosure, the electromagnetic wave generation module is disposed on the outer side of the heat insulating layer of the cabinet. The housing is separated into the air inlet area and the air outlet area. The electromagnetic wave generation module and the cooling fan are disposed in the air outlet area. The flowing direction of air flow from any air inlet to the air vents is perpendicular to the flowing direction of air flow from the air vents to each air outlet. Influences of heat generated by the electromagnetic wave generation system on the storage compartment of the cabinet are reduced. The storage quality of food materials in the storage compartment is improved. Moreover, wind resistance of the cooling fan is reduced. The cooling efficiency is further improved. The circumstances that water and dust enter the housing via the air inlets and the air outlets, and then the electromagnetic wave generation module and the cooling fan are affected with damp and dust are further avoided. Potential safety hazards are avoided.

Further, in the present disclosure, the power supply module is disposed in the air outlet area, and is located on the side of the electromagnetic wave generation module perpendicular to the flowing direction of air flow from at least one air vent to each air outlet. The heat conducting material is disposed to connect the separator to the power supply module. Thus, the cooling fan cools the power supply module and the electromagnetic wave generation module respectively in processes of sucking air flow and blowing out air flow. The structure is more compact. The cooling efficiency of the electromagnetic wave generation module and the power supply module is further improved on the whole. The heating efficiency on the item to be treated is ensured. The service lives of the electromagnetic wave generation module and the power supply module are prolonged.

According to another aspect of the present disclosure, further provided is a refrigerating and freezing apparatus, including:

- a cabinet and a heating unit, wherein the heating unit includes:
- a cylinder, disposed in the cabinet, and configured to contain an item to be treated; and
- an electromagnetic wave generation system, at least one part thereof being disposed in the cylinder or accessed into the cylinder to generate an electromagnetic wave in the cylinder to heat the item to be heated, wherein the electromagnetic wave generation system includes:
- an electromagnetic wave generation module, configured to generate an electromagnetic wave signal; and
- a power supply module, configured to provide electric energy for the electromagnetic wave generation module; and the heating unit further includes:
- at least one cooling fan, disposed to cool the electromagnetic wave generation module and the power supply module.

Optionally, the refrigerating and freezing apparatus further includes:

- cooling fins, including a plurality of rib plates perpendicular to the electromagnetic wave generation module and thermally connected to the electromagnetic wave generation module, wherein
- the at least one cooling fan is disposed on sides of the cooling fins away from the electromagnetic wave generation module, and is disposed to blow out air flow towards the electromagnetic wave generation module, wherein
- the electromagnetic wave generation module and the power supply module are disposed on an outer side of a heat insulating layer of the cabinet; and/or
- the at least one cooling fan is disposed above the electromagnetic wave generation module.

Optionally, an extending direction of the plurality of rib plates is disposed to be perpendicular to a direction of the electromagnetic wave generation module close to the power supply module;

at least one of the rib plates thermally connected to a middle of the electromagnetic wave generation module is provided with an accommodating portion recessed towards a direction close to the electromagnetic wave generation module; and the at least one cooling fan is disposed in the accommodating portion, and a projection of the at least one cooling fan in an extending direction perpendicular to the plurality of rib plates is at least located in one of the rib plates.

Optionally, the at least one cooling fan is disposed to suck air flow via the power supply module and prompt the air flow to be blown out towards the electromagnetic wave generation module.

Optionally, the refrigerating and freezing apparatus further includes:

a housing, disposed to cover the electromagnetic wave generation module, the power supply module and the at least one cooling fan; and a separator, disposed in the housing and located on a side of the at least one cooling fan away from the electromagnetic wave generation module to separate a space in the housing into an air inlet area and an air outlet area, wherein the at least one cooling fan and the electromagnetic wave generation module are disposed in the air outlet area; and the air inlet area and the air outlet area are respectively provided with at least one air inlet and at least one air outlet in a circumferential direction of the at least one cooling fan, and at least one air vent is formed in a position of the separator corresponding to the at least one cooling fan.

Optionally, a flowing direction of air flow from the at least one air inlet to the at least one air vent respectively is perpendicular to a flowing direction of air flow from the at least one air vent to each air outlet;

the power supply module is disposed in the air outlet area, and located on a side of the electromagnetic wave generation module perpendicular to the flowing direction of air flow from the at least one air vent to each air outlet, and the refrigerating and freezing apparatus further includes:

a heat conducting material, disposed to be thermally connected to the power supply module and the separator.

In the present disclosure, the electromagnetic wave generation module and the power supply module are cooled simultaneously by means of the cooling fan, efficient cooling on the electromagnetic wave generation module and the power supply module can be realized, moreover, occupied space is reduced, and the storage space of the refrigerating and freezing apparatus is expanded.

Further, in the present disclosure, the housing is separated into the air inlet area and the air outlet area. The electromagnetic wave generation module, the power supply module and the cooling fan are disposed in the air outlet area. The cooling fan cools the power supply module and the electromagnetic wave generation module respectively in the processes of sucking air flow and blowing out the air flow. The structure is more compact. The cooling efficiency of the electromagnetic wave generation module and the power supply module is further improved on the whole. The heating efficiency on the item to be treated is ensured. The service lives of the electromagnetic wave generation module and the power supply module are prolonged.

Further, in the present disclosure, the electromagnetic wave generation module and the power supply module are disposed above the heat insulating layer of the cabinet. The flowing direction of air flow from any air inlet to an air vent is perpendicular to the flowing direction of air flow from the air vent to each air outlet. Influences of heat generated by the electromagnetic wave generation system on the storage compartment of the cabinet are reduced. The storage quality of food materials in the storage compartment is improved. Moreover, wind resistance of the cooling fan is reduced. The cooling efficiency is further improved. The circumstances that water and dust enter the housing via the air inlets and the air outlets, and then the electromagnetic wave generation module and the power supply module are affected with damp and dust are further avoided. Potential safety hazards are avoided.

The above and other objects, advantages and features of the present disclosure will become more apparent to those skilled in the art from the following detailed description of specific embodiments thereof taken in conjunction with the accompanying drawings.

BRIEF DESCRIPTION OF THE DRAWINGS

Some specific embodiments of the present disclosure will be described in detail hereinafter by way of example and not by way of limitation with reference to the accompanying drawings. The same reference numerals in the drawings identify the same or similar elements or parts. Those skilled in the art will appreciate that the drawings are not necessarily drawn to scale. In the drawings.

DETAILED DESCRIPTION

Figure 1:
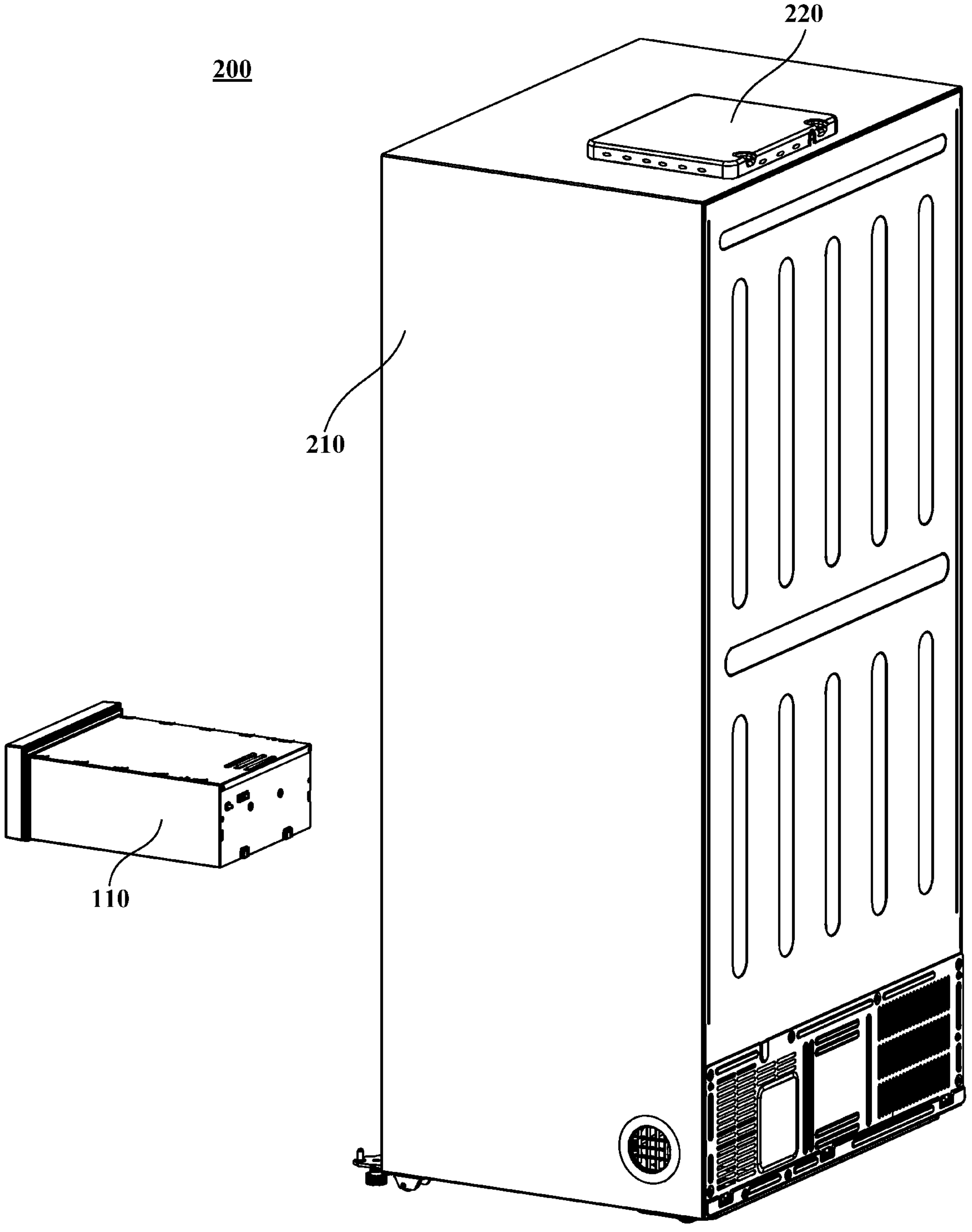
FIG. 1 is a schematic exploded view of a refrigerating and freezing apparatus according to an embodiment of the present disclosure.
Figure 2:
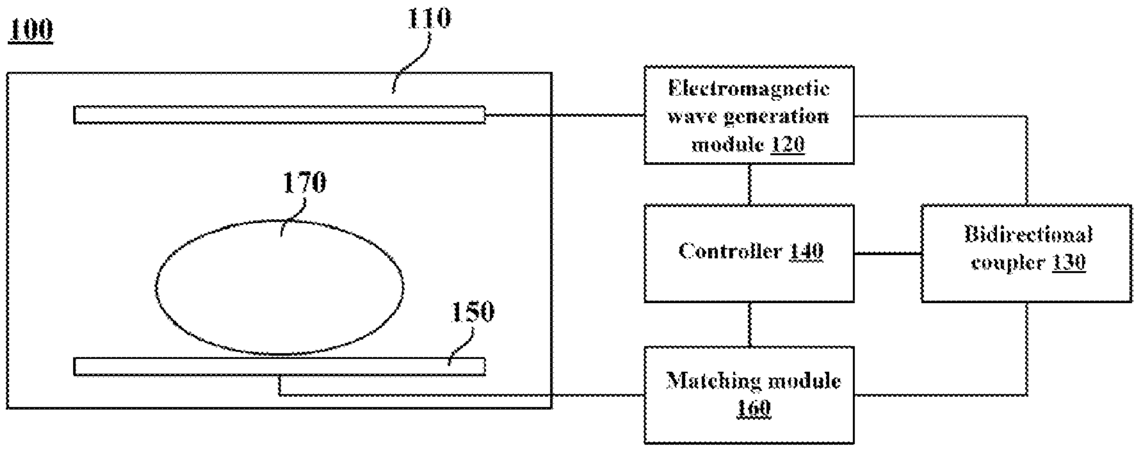
FIG. 2 is a schematic structural view of a heating unit according to an embodiment of the present disclosure.

FIG. 1 is a schematic exploded view of a refrigerating and freezing apparatus 200 according to an embodiment of the present disclosure. FIG. 2 is a schematic structural view of a heating unit 100 according to an embodiment of the present disclosure. Referring to FIG. 1 and FIG. 2, the refrigerating and freezing apparatus 200 may include a cabinet 210 defining at least one storage compartment, at least one door configured to open and close the at least one storage compartment, a heating unit 100 and a controller. In the present disclosure, the refrigerating and freezing apparatus 200 may be an apparatus with a refrigerating or freezing function such as a refrigerator, a freezer, a cooler, a wine cabinet and so on.

The cabinet 210 may include a liner defining at least one storage compartment, an outer tank and a heat insulating layer disposed between the liner and the outer tank.

The heating unit 100 may include a cylinder 110 disposed in one storage compartment of the cabinet 210, a door and an electromagnetic wave generation system.

Specifically, the cylinder 110 may define a heating chamber configured to contain an item to be treated 170, and a pick-and-place opening may be formed in the front wall of the heating chamber and is configured to pick and place the item to be treated 170.

The door may be mounted with the cylinder 110 together by an appropriate method, such as connection by a slide track and connection in a hinged manner, and is configured to open and close the pick-and-place opening.

At least one part of the electromagnetic wave generation system may be disposed in the cylinder 110 or accessed into the cylinder 110 to generate an electromagnetic wave in the cylinder 110 to heat the item to be heated 170.

The cylinder 110 and the door may be respectively provided with electromagnetic shielding features, so that the door is in conductive connection with the cylinder 110 when the door is closed to prevent electromagnetic leakage.

Figure 3:
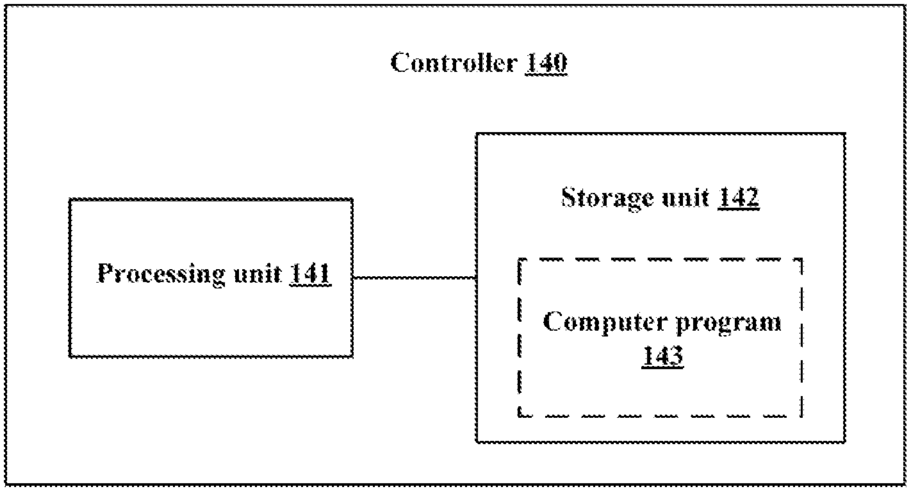
FIG. 3 is a schematic structural view of a controller in FIG. 2.

FIG. 3 is a schematic structural view of a controller in FIG. 2. Referring to FIG. 3, the controller 140 may include a processing unit 141 and a storage unit 142. A computer program 143 is stored in the storage unit 142. The computer program 143 is configured to implement the control method according to an embodiment of the present disclosure when the computer program is executed by the processing unit 141.

In some embodiments, the electromagnetic wave generation system may include an electromagnetic wave generation module 120, a power supply module 180, a radiating antenna 150, and a matching module 160.

Figure 4:
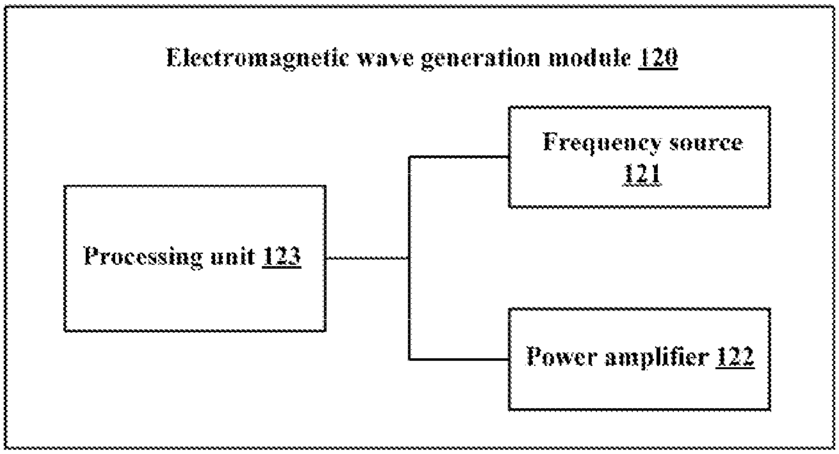
FIG. 4 is a schematic structural view of an electromagnetic wave generation module in FIG. 2.

The electromagnetic wave generation module 120 may be configured to generate an electromagnetic wave signal. FIG. 4 is a schematic structural view of the electromagnetic wave generation module 120 in FIG. 2. Referring to FIG. 4, in some embodiments, the electromagnetic wave generation module 120 may include a frequency source 121, a power amplifier 122 and a processing unit 123.

The power supply module 180 may be disposed to be electrically connected to the electromagnetic wave generation module 120 so as to provide electric energy for the electromagnetic wave generation module 120, and then the electromagnetic wave generation module 120 generates the electromagnetic wave signal.

The radiating antenna 150 may be disposed in the cylinder 110 and is electrically connected to the electromagnetic wave generation module 120 so as to generate an electromagnetic wave with a corresponding frequency according to the electromagnetic wave signal to heat the item to be treated 170 in the cylinder 110.

The matching module 160 may be connected between the electromagnetic wave generation module 120 and the radiating antenna 150 in series, and is configured to adjust load impedance of the electromagnetic wave generation module 120 by means of adjusting self impedance to achieve load matching and improve heating efficiency.

In some further embodiments, the cylinder 110 may be made of metal to serve as a receiving pole of the radiating antenna 150. In the embodiments, the cylinder 110 itself is an electromagnetic shielding feature of the cylinder 110.

In other further embodiments, the electromagnetic wave generation system further includes a receiving polar plate which is opposite to the radiating antenna 150 and electrically connected to the electromagnetic wave generation module 120. In the embodiments, the inner wall of the cylinder 110 may be coated with a metal coating or attached with a metal net and the like as the electromagnetic shielding feature of the cylinder 110.

Figure 5:
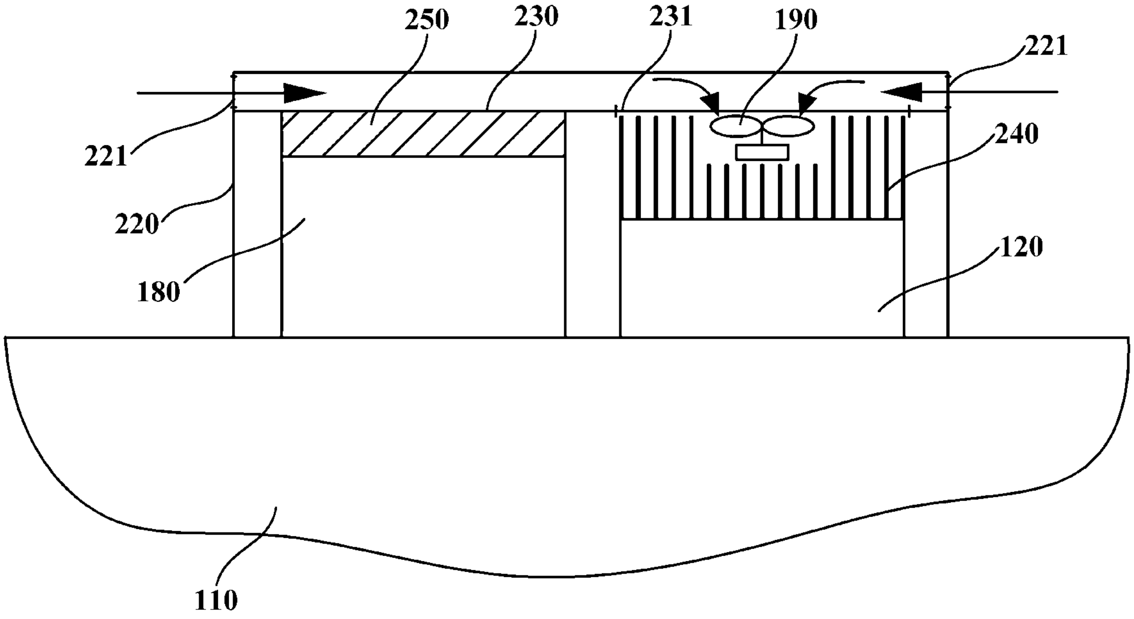
FIG. 5 is a schematic partial cross-sectional view of the refrigerating and freezing apparatus shown in FIG. 1.

FIG. 5 is a schematic partial cross-sectional view of the refrigerating and freezing apparatus 200 as shown in FIG. 1. Referring to FIG. 5, particularly, the heating unit 100 may further include at least one cooling fan 190 configured to cool the electromagnetic wave generation module 120 and the power supply module 180. In the present disclosure, the electromagnetic wave generation module 120 and the power supply module 180 are cooled simultaneously by means of the cooling fan 190; thus, efficient cooling on the electromagnetic wave generation module 120 and the power supply module 180 may be realized, furthermore, occupied space is reduced, and the storage space of the refrigerating and freezing apparatus 200 is expanded.

In the present disclosure, the number of the cooling fans 190 may be one, two, or more than two. For the convenience of understanding of the present disclosure, the present disclosure will be described hereinafter by taking one cooling fan 190 as an example.

In some embodiments, the refrigerating and freezing apparatus 200 may further include cooling fins 240 thermally connected to the electromagnetic wave generation module 120 to increase the cooling area of the electromagnetic wave generation module 120, and then the cooling efficiency of the electromagnetic wave generation module 120 is improved.

The cooling fins 240 may include a plurality of rib plates perpendicular to the 40 electromagnetic wave generation module 120, namely, each rib plate extends from the electromagnetic wave generation module 120 towards a direction away from the electromagnetic wave generation module 120, and is perpendicular to a surface where the rib plate is mounted.

The cooling fins 240 may further include a substrate integrated with the plurality of rib plates, and the substrate is configured to be thermally connected to the electromagnetic wave generation module 120.

The cooling fan 190 may be disposed on sides of the cooling fins 240 away from the electromagnetic wave generation module 120, and is disposed to blow out air flow towards the electromagnetic wave generation module 120. Namely, the electromagnetic wave generation module 120 is disposed downstream of the cooling fan 190 to reduce wind resistance, and the cooling efficiency of the electromagnetic wave generation module 120 is improved.

The extending direction of the plurality of rib plates may further be disposed to be perpendicular to a direction of the electromagnetic wave generation module 120 close to the power supply module 180, so as to reduce influences of heat generated by the electromagnetic wave generation module 120 on the power supply module 180.

At least one rib plate thermally connected to the middle of the electromagnetic wave generation module 120 is provided with an accommodating portion recessed towards a direction close to the electromagnetic wave generation module 120.

The cooling fan 190 may be disposed in the accommodating portion. A projection of the cooling fan 190 in an extending direction perpendicular to the plurality of rib plates is at least located in one of the rib plates, so as to further reduce influences of the heat on the power supply module 180 and further improve the cooling efficiency of the electromagnetic wave generation module 120.

The cooling fan 190 may be disposed to suck air flow via the power supply module 180 and prompt the air flow to be blown out towards the electromagnetic wave generation module 120, so as to improve the cooling efficiency of the electromagnetic wave generation module 120 and the power supply module 180 on the whole while the compactness of the structure is improved.

The refrigerating and freezing apparatus 200 may further include a housing 220 and a separator 230. The housing 220 may be configured to cover the electromagnetic wave generation module 120, the power supply module 180 and the cooling fan 190.

The separator 230 may be disposed in the housing 220 and is disposed on a side of the cooling fan 190 away from the electromagnetic wave generation module 120, so as to separate a space in the housing 220 into an air inlet area and an air outlet area. The cooling fan 190 and the electromagnetic wave generation module 120 may be disposed in the air outlet area.

Figure 6:
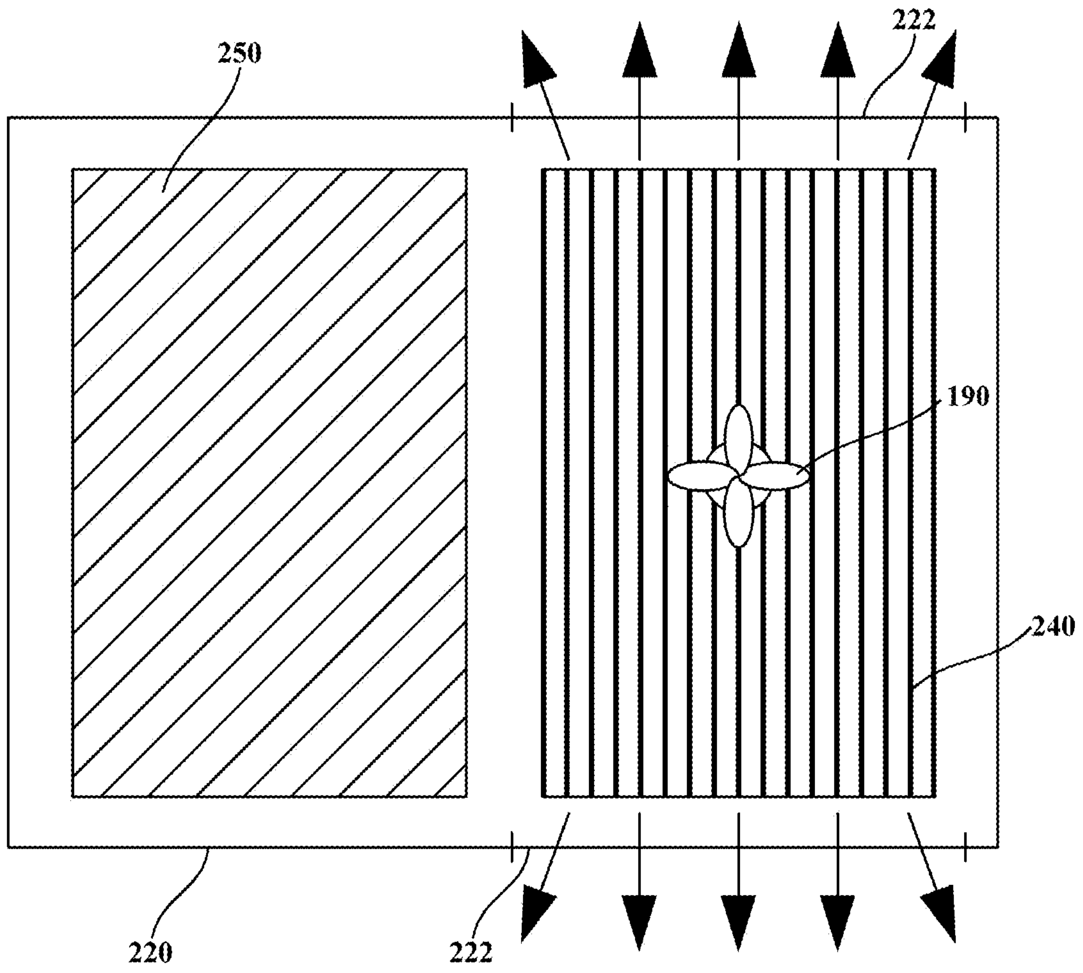
FIG. 6 is a schematic top view of an air outlet area in FIG. 5.

FIG. 6 is a schematic top view of the air outlet area in FIG. 5. Referring to FIG. 5 and FIG. 6, the air inlet area and the air outlet area are respectively provided with at least one air inlet 221 and at least one air outlet 222 in a circumferential direction of the cooling fan 190. At least one air vent 231 is formed in a position of the separator 230 corresponding to the at least one cooling fan 190. Thus, the circumstances that water and dust enter the housing 220 via the air inlet 221 and the air outlet 222, and then the electromagnetic wave generation module 120 and the power supply module 180 are affected with damp and dust are avoided. Potential safety hazards are also avoided.

The flowing direction of air flow from the at least one air inlet 221 to the at least one air vent 231 respectively is perpendicular to the flowing direction of air flow from the at least one air vent 231 to each air outlet 222, so as to further reduce wind resistance and improve cooling efficiency.

The power supply module 180 may be disposed in the air outlet area, and is located on a side of the electromagnetic wave generation module 120 perpendicular to the flowing direction of air flow from the at least one air vent 231 to each air outlet 222, so that the cooling fan 190 cools the power supply module 180 and the electromagnetic wave generation module 120 respectively in processes of sucking air flow and blowing out the air flow. Influences of heat on the power supply module 180 are further reduced. The cooling efficiency is improved.

Further, the refrigerating and freezing apparatus 200 further includes a heat conducting material 250 thermally connected to the power supply module 180 and the separator 230, so as to improve the cooling efficiency of the power supply module 180.

The electromagnetic wave generation module 120, the power supply module 180, the cooling fan 190 and the housing 220 may be disposed on the outer side of the heating chamber, so as to reduce influences of heat generated by the electromagnetic wave generation module 120 and the power supply module 180 on the item to be treated 170 in the heating chamber. Further, the electromagnetic wave generation module 120 and the like may be disposed on the outer side of the heat insulating layer of the cabinet 210.

The cooling fan 190 may be disposed above the electromagnetic wave generation module 120. Namely, the electromagnetic wave generation module 120 may be disposed above the heat insulating layer, so as to improve the stability of the electromagnetic wave generation module 120 and the cooling fan 190.

The processing unit 141 may be configured to acquire a forward power signal output from the electromagnetic wave generation module 120 and a reverse power signal returned to the electromagnetic wave generation module 120 during working of the electromagnetic wave generation module 120, calculate an electromagnetic wave absorption rate of the item to be treated 170 according to the forward power signal and the reverse power signal, and adjust a rotation speed of the cooling fan 190 according to the power value of the forward power signal (namely the output power of the electromagnetic wave generation module 120) and the electromagnetic wave absorption rate.

A bidirectional coupler 130 may be connected between the electromagnetic wave generation module 120 and the radiating antenna 150 in series, to monitor the forward power signal output from the electromagnetic wave generation module 120 and the reverse power signal returned to the electromagnetic wave generation module 120.

In the present disclosure, the heating unit 100 adjusts, according to the power value of the forward power signal output from the electromagnetic wave generation module 120 and the electromagnetic wave absorption rate of the item to be treated 170, the rotation speed of the cooling fan 190 for cooling the electromagnetic wave generation module 120. Compared to a means of adjusting the rotation speed of the cooling fan 190 according to the temperature of the electromagnetic wave generation module 120, there is no need to arrange additional temperature sensing apparatuses, the heat generated by the electromagnetic wave generation module 120 can be reflected more precisely, unexpected energy waste and noise pollution are avoided while fully cooling the electromagnetic wave generation module 120, and user experiences are improved.

In some further embodiments, the processing unit 141 may be configured to match with the rotation speed of the cooling fan 190 on the basis of a preset rotation speed correspondence relation according to the power value of the forward power signal and the electromagnetic wave absorption rate. The rotation speed correspondence relation records rotation speeds corresponding to power values in different ranges and electromagnetic wave absorption rates in different ranges.

Under the condition that the power values of the forward power signal are the same, the rotation speed of the cooling fan 190 may be in negative correlation with an average value of the electromagnetic wave absorption rates in different ranges; and under the condition that the electromagnetic wave absorption rates are the same, the rotation speed of the cooling fan 190 may be in positive correlation with an average value of the power values in different ranges, so that the electromagnetic wave generation module 120 is cooled efficiently in an energy-saving mode.

The rotation speed correspondence relation may also be a formula which records different power values, electromagnetic wave absorption rates and rotation speeds.

The processing unit 141 may also be configured to acquire a temperature of the processing unit 123 of the electromagnetic wave generation module 120 in real time when the electromagnetic wave generation module 120 works, and control the frequency source 121 and the power amplifier 122 to stop working when the temperature of the processing unit 123 is greater than or equal to a preset temperature threshold, so as to guarantee the service life of the processing unit 123.

The processing unit 141 may further be configured to control the cooling fan 190 to work at a rated rotation speed for a first preset time and then stop working after controlling the frequency source 121 and the power amplifier 122 to stop working, so as to dissipate heat in the housing 220 quickly and avoid heat accumulation.

Figure 7:
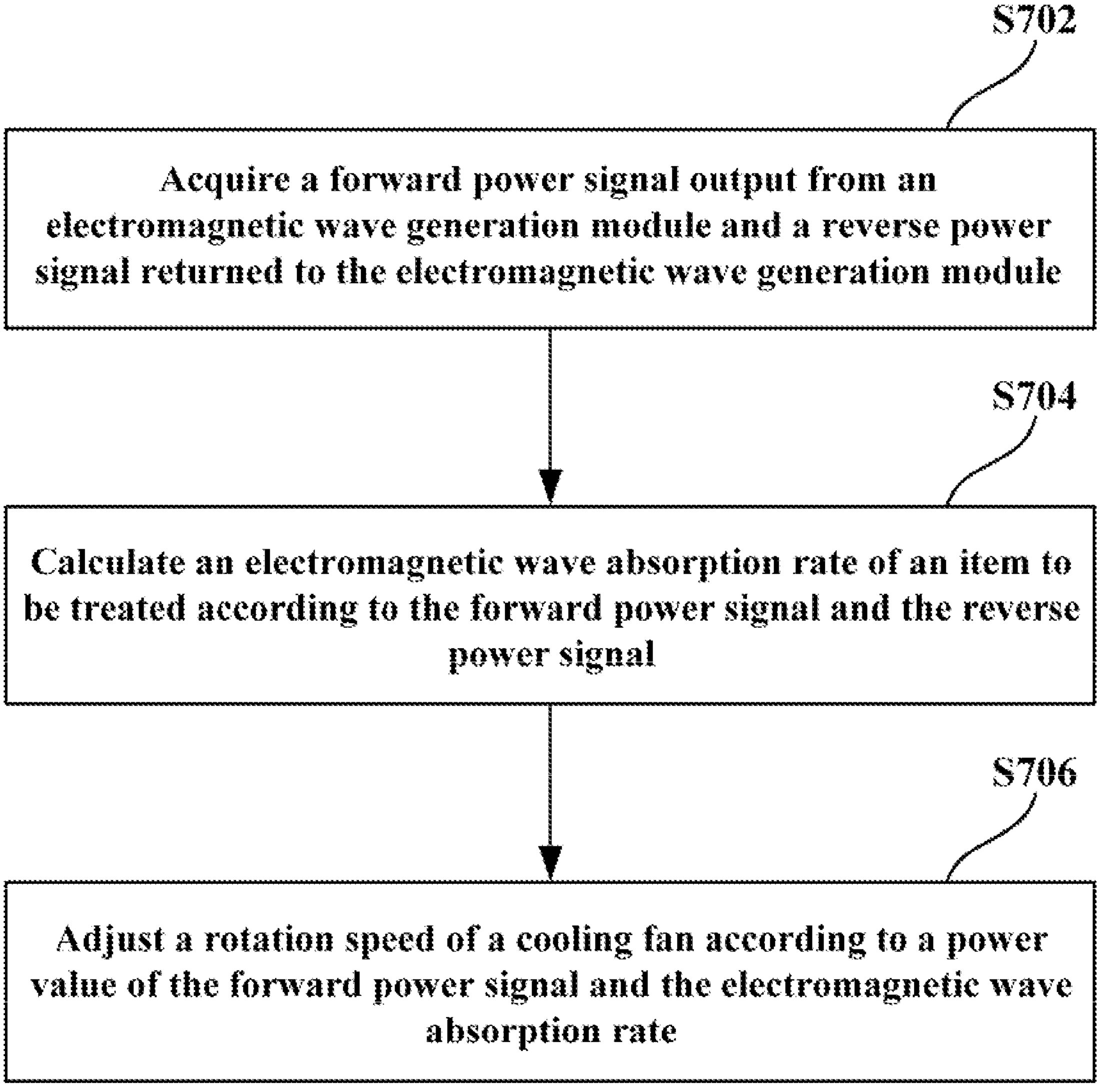
FIG. 7 is a schematic flow chart of a control method for a heating unit according to an embodiment of the present disclosure.

FIG. 7 is a schematic flow chart of a control method for the heating unit 100 according to an embodiment of the present disclosure. Referring to FIG. 7, the control method for the heating unit 100 executed by the controller 140 of any embodiment mentioned above may include the following steps:

Step S702: The forward power signal output from the electromagnetic wave generation module 120 and the reverse power signal returned to the electromagnetic wave generation module 120 are acquired.

Step S704: The electromagnetic wave absorption rate of the item to be treated 170 is calculated according to the forward power signal and the reverse power signal.

Step S706: The rotation speed of the cooling fan 190 is adjusted according to the power value of the forward power signal and the electromagnetic wave absorption rate.

In the control method of the present disclosure, the rotation speed of the cooling fan 190 for cooling the electromagnetic wave generation module 120 is adjusted according to the power value of the forward power signal output from the electromagnetic wave generation module 120 and the electromagnetic wave absorption rate of the item to be treated 170. Compared to the means of adjusting the rotation speed of the cooling fan 190 according to the temperature of the electromagnetic wave generation module 120, there is no need to dispose additional temperature sensing apparatuses, the heat generated by the electromagnetic wave generation module 120 can be reflected more precisely, and unexpected energy waste and noise pollution are avoided while fully cooling the electromagnetic wave generation module 120, and user experiences are improved.

Figure 8:
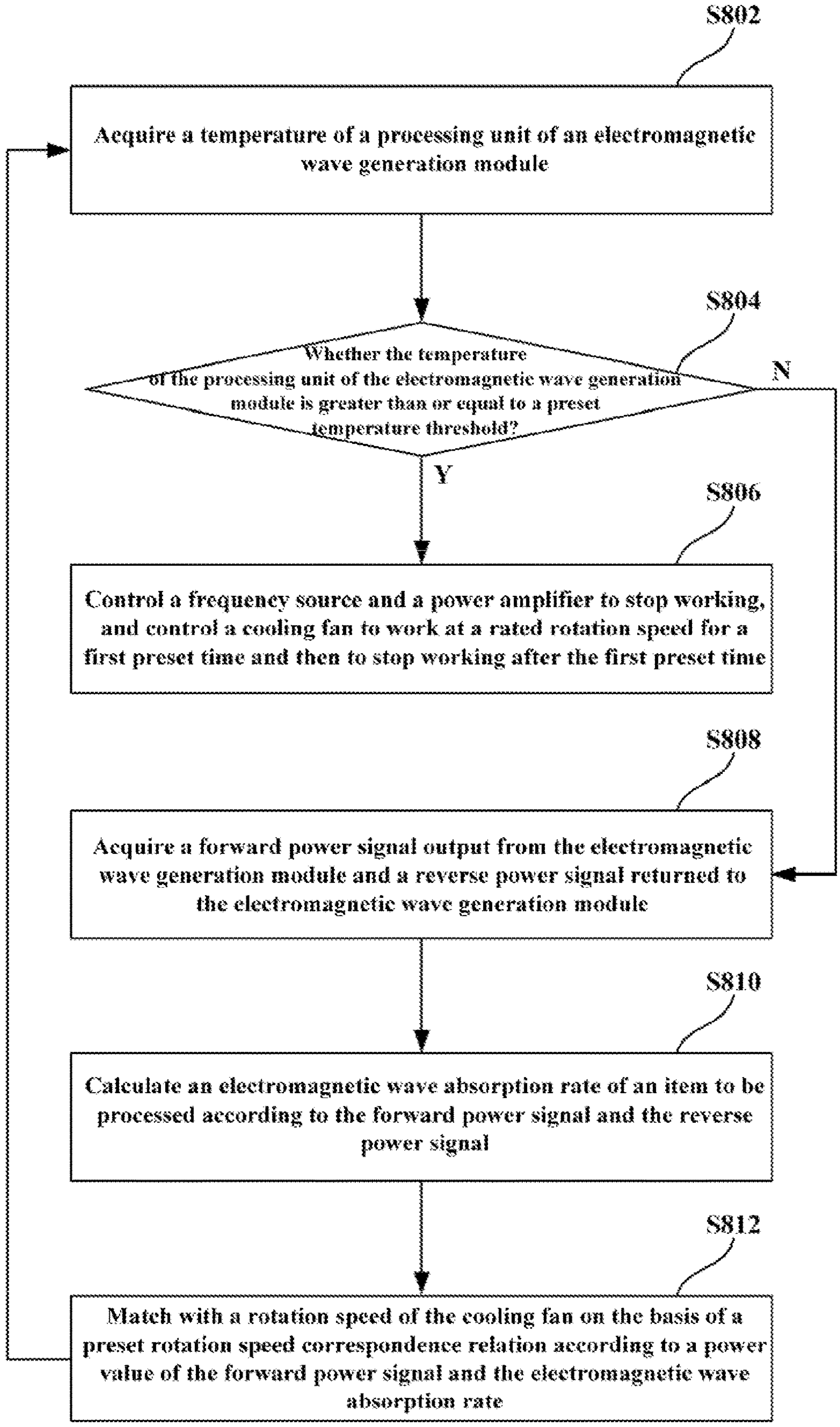
FIG. 8 is a detailed flow chart of the control method for the heating unit according to an embodiment of the present disclosure.

FIG. 8 is a detailed flow chart of the control method for the heating unit 100 according to an embodiment of the present disclosure. Referring to FIG. 8, the control method for the heating unit 100 of the present disclosure may include the following steps:

Step S802: The temperature of the processing unit of the electromagnetic wave generation module 120 is acquired.

Step S804: Whether the temperature of the processing unit 123 of the electromagnetic wave generation module 120 is greater than or equal to a preset temperature threshold is determined. If so, the step S806 is executed; and if not, the step S808 is executed.

Step S806: The frequency source 121 and the power amplifier 122 are controlled to stop working, the cooling fan 190 works at the rated rotation speed for the first preset time and then stops working after the first preset time, so as to guarantee the service life of the processing unit 123, and prevent heat from being accumulated in the housing 220.

Step S808: The forward power signal output from the electromagnetic wave generation module 120 and the reverse power signal returned to the electromagnetic wave generation module 120 are acquired. In this step, the forward power signal and the reverse power signal may be monitored and obtained by the bidirectional coupler 130 connected between the electromagnetic wave generation module 120 and the radiating antenna 150 in series. Then step S810 is executed.

Step S810: The electromagnetic wave absorption rate of the item to be treated 170 is calculated according to the forward power signal and the reverse power signal. Then step S812 is executed.

Step S812: The rotation speed of the cooling fan 190 is matched on the basis of the rotation speed correspondence relation according to the power value of the forward power signal and the electromagnetic wave absorption rate. Under the condition that the power values of the forward power signal are the same, the rotation speed of the cooling fan 190 may be in negative correlation with the average value of the electromagnetic wave absorption rates in different ranges; and under the condition that the electromagnetic wave absorption rates are the same, the rotation speed of the cooling fan 190 may be in positive correlation with the average value of the power values in different ranges, so that the electromagnetic wave generation module 120 is cooled efficiently in an energy-saving manner. The step S802 is executed again.

Thus, it should be appreciated by those skilled in the art that while various exemplary embodiments of the present disclosure have been shown and described in detail herein, many other variations or modifications which are consistent with the principles of the present disclosure can be determined or derived directly from the contents disclosed by the present disclosure without departing from the spirit and scope of the present disclosure. Accordingly, the scope of the present disclosure should be understood and interpreted to cover all such other variations or modifications.

The invention claimed is:

1. A control method for a heating unit, the heating unit comprising a cylinder configured to contain an item to be treated, and an electromagnetic wave generation system of which at least one part is disposed in the cylinder or accessed into the cylinder, and the electromagnetic wave generation system comprising an electromagnetic wave generation module configured to generate an electromagnetic wave signal and a cooling fan configured to cool the electromagnetic wave generation module, wherein the control method comprises:

acquiring a forward power signal output from the electromagnetic wave generation module and a reverse power signal returned to the electromagnetic wave generation module;

calculating an electromagnetic wave absorption rate of the item to be treated according to the forward power signal and the reverse power signal; and adjusting a rotation speed of the cooling fan according to a power value of the forward power signal, and the electromagnetic wave absorption rate, wherein the step of adjusting a rotation speed of the cooling fan according to a power value of the forward power signal, and the electromagnetic wave absorption rate comprises:

matching with the rotation speed of the cooling fan on the basis of a preset rotation speed correspondence relation according to the power value of the forward power signal, and the electromagnetic wave absorption rate, wherein the rotation speed correspondence relation records rotation speeds corresponding to power values in different ranges and electromagnetic wave absorption rates in different ranges; and wherein under the condition that the power values of the forward power signal are the same, the rotation speed of the cooling fan is in negative correlation with an average value of the electromagnetic wave absorption rates in different ranges; and under the condition that the electromagnetic wave absorption rates are the same, the rotation speed of the cooling fan is in positive correlation with an average value of the power values in different ranges.

2. The control method according to claim 1, wherein the electromagnetic wave generation module comprises a frequency source, a power amplifier and a processing unit; and the control method further comprises:

acquiring a temperature of the processing unit; and controlling the frequency source and the power amplifier to stop working if the temperature of the processing unit is greater than or equal to a preset temperature threshold.

3. The control method according to claim 2, wherein after the step of controlling the frequency source and the power amplifier to stop working, the control method further comprises:

controlling the cooling fan to work at a rated rotation speed for a first preset time, and controlling the cooling fan to stop working after the first preset time.

4. A heating unit, comprising:

a cylinder, configured to contain an item to be treated;

an electromagnetic wave generation system, at least one part thereof being disposed in the cylinder or accessed into the cylinder to generate an electromagnetic wave in the cylinder to heat the item to be treated, and the electromagnetic wave generation system comprising an electromagnetic wave generation module configured to generate an electromagnetic wave signal and a cooling fan configured to cool the electromagnetic wave generation module; and a controller, configured to execute the following steps:

acquiring a forward power signal output from the electromagnetic wave generation module and a reverse power signal returned to the electromagnetic wave generation module;

calculating an electromagnetic wave absorption rate of the item to be treated according to the forward power signal and the reverse power signal; and adjusting a rotation speed of the cooling fan according to a power value of the forward power signal, and the electromagnetic wave absorption rate, wherein the step of adjusting a rotation speed of the cooling fan according to a power value of the forward power signal, and the electromagnetic wave absorption rate comprises:

matching with the rotation speed of the cooling fan on the basis of a preset rotation speed correspondence relation according to the power value of the forward power signal, and the electromagnetic wave absorption rate, wherein the rotation speed correspondence relation records rotation speeds corresponding to power values in different ranges and electromagnetic wave absorption rates in different ranges; and wherein under the condition that the power values of the forward power signal are the same, the rotation speed of the cooling fan is in negative correlation with an average value of the electromagnetic wave absorption rates in different ranges; and under the condition that the electromagnetic wave absorption rates are the same, the rotation speed of the cooling fan is in positive correlation with an average value of the power values in different ranges.

5. The heating unit according to claim 4, wherein the electromagnetic wave generation system further comprises:

a radiating antenna, disposed in the cylinder, and electrically connected to the electromagnetic wave generation module to radiate the electromagnetic wave in the cylinder; and a bidirectional coupler, connected between the electromagnetic wave generation module and the radiating antenna in series, and configured to monitor the forward power signal and the reverse power signal, wherein the cylinder defines a heating chamber configured to contain the item to be treated; and the electromagnetic wave generation module is disposed on an outer side of the heating chamber.

6. A refrigerating and freezing apparatus, comprising:

a cabinet, defining at least one storage compartment; and the heating unit according to claim 4, wherein the cylinder is disposed in one of the at least one storage compartment, and the electromagnetic wave generation module is disposed on an outer side of a heat insulating layer of the cabinet.

7. The refrigerating and freezing apparatus according to claim 6, further comprising:

a housing, disposed to cover the electromagnetic wave generation module and the cooling fan; and a separator, disposed in the housing and located on a side of the cooling fan away from the electromagnetic wave generation module to separate a space in the housing into an air inlet area and an air outlet area, wherein the cooling fan and the electromagnetic wave generation module are disposed in the air outlet area;

the air inlet area and the air outlet area are respectively provided with at least one air inlet and at least one air outlet in a circumferential direction of the cooling fan, and at least one air vent is formed in a position of the separator corresponding to the cooling fan; and a flowing direction of air flow from the at least one air inlet to the at least one air vent respectively is perpendicular to a flowing direction of air flow from the at least one air vent to each air outlet.

8. The refrigerating and freezing apparatus according to claim 7, wherein the electromagnetic wave generation system further comprises:

a power supply module, configured to provide electric energy for the electromagnetic wave generation module, wherein the power supply module is disposed in the air outlet area, and located on a side of the electromagnetic wave generation module perpendicular to the flowing direction of air flow from the at least one air vent to each air outlet; and the power supply module is provided with a heat conducting material, and the heat conducting material is disposed to be thermally connected to the separator.

9. A refrigerating and freezing apparatus, comprising:

a cabinet and a heating unit, wherein the heating unit comprises:

a cylinder, disposed in the cabinet, and configured to contain an item to be treated; and an electromagnetic wave generation system, at least one part thereof being disposed in the cylinder or accessed into the cylinder to generate an electromagnetic wave in the cylinder to heat the item to be heated, wherein the electromagnetic wave generation system comprises:

an electromagnetic wave generation module, configured to generate an electromagnetic wave signal; and a power supply module, configured to provide electric energy for the electromagnetic wave generation module; and the heating unit further comprises:

at least one cooling fan, disposed to cool the electromagnetic wave generation module and the power supply module;

wherein the refrigerating and freezing apparatus further comprises:

a housing, disposed to cover the electromagnetic wave generation module, the power supply module and the at least one cooling fan; and a separator, disposed in the housing and located on a side of the at least one cooling fan away from the electromagnetic wave generation module to separate a space in the housing into an air inlet area and an air outlet area, wherein the at least one cooling fan and the electromagnetic wave generation module are disposed in the air outlet area; and wherein the air inlet area and the air outlet area are respectively provided with at least one air inlet and at least one air outlet in a circumferential direction of the at least one cooling fan, and at least one air vent is formed in a position of the separator corresponding to the at least one cooling fan.

10. The refrigerating and freezing apparatus according to claim 9, further comprising:

cooling fins, comprising a plurality of rib plates perpendicular to the electromagnetic wave generation module and thermally connected to the electromagnetic wave generation module, wherein the at least one cooling fan is disposed on sides of the cooling fins away from the electromagnetic wave generation module, and is disposed to blow out air flow towards the electromagnetic wave generation module, wherein the electromagnetic wave generation module and the power supply module are disposed on an outer side of a heat insulating layer of the cabinet; and/or the at least one cooling fan is disposed above the electromagnetic wave generation module.

11. The refrigerating and freezing apparatus according to claim 10, wherein an extending direction of the plurality of rib plates is disposed to be perpendicular to a direction of the electromagnetic wave generation module close to the power supply module;

at least one of the rib plates thermally connected to a middle of the electromagnetic wave generation module is provided with an accommodating portion recessed towards a direction close to the electromagnetic wave generation module; and the at least one cooling fan is disposed in the accommodating portion, and a projection of the at least one cooling fan in an extending direction perpendicular to the plurality of rib plates is at least located in one of the rib plates.

12. The refrigerating and freezing apparatus according to claim 9, wherein the at least one cooling fan is disposed to suck air flow via the power supply module and prompt the air flow to be blown out towards the electromagnetic wave generation module.

13. The refrigerating and freezing apparatus according to claim 9, wherein a flowing direction of air flow from the at least one air inlet to the at least one air vent respectively is perpendicular to a flowing direction of air flow from the at least one air vent to each air outlet;

the power supply module is disposed in the air outlet area, and located on a side of the electromagnetic wave generation module perpendicular to the flowing direction of air flow from the at least one air vent to each air outlet, and the refrigerating and freezing apparatus further comprises:

a heat conducting material, disposed to be thermally connected to the power supply module and the separator.

* * * * *